United States Patent [19] [11] 3,965,184
Banks et al. [45] June 22, 1976

[54] NOVEL MATERIALS CONTAINING NITROGEN

[75] Inventors: Ronald Eric Banks, Hazel Grove; Robert Neville Haszeldine, Disley, both of England

[73] Assignee: The Secretary of State for Defence in Her Britannic Majesty's Government of the United Kingdom of Great Britain and Northern Ireland, London, England

[22] Filed: Jan. 30, 1973

[21] Appl. No.: 327,839

[30] Foreign Application Priority Data

Jan. 31, 1972 United Kingdom................. 4382/72

[52] U.S. Cl.......................... 260/583 D; 260/307 G; 260/268 PC; 260/239 R; 260/244 R; 260/250 BN; 204/158 R; 204/177
[51] Int. Cl.²........................................ C07C 135/02
[58] Field of Search................................ 260/583 D

[56] References Cited
UNITED STATES PATENTS 3,200,158  10/1965  Blackley................... 260/583 D UX
3,812,206  5/1974  Banks et al. ................ 260/583 D X

OTHER PUBLICATIONS

Chemical Abstracts, 65, p. 8742b, 1966.

Primary Examiner—Paul F. Shaver
Attorney, Agent, or Firm—Stevens, Davis, Miller & Mosher

[57] ABSTRACT

Compositions of matter including the structural unit

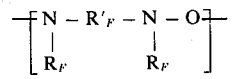

wherein $R'_F$ is a divalent polyfluoroalkylene group having a chain length of from 1 to 4 carbon atoms which may be substituted at one or more positions with chloro-or polyfluoroalkyl, chlorofluoroalyl or polyfluorocycloalkyl groups containing up to six carbon atoms; and $R_F$ is a monovalent straight or branched chain, or cyclic, polyfluoroalkyl group or a chlorofluoroalkyl group containing up to ten carbon atoms and the $R_F$ groups are the same or different or is a divalent polyfluoro-alkylene group having a chain length of from 1 to 4 carbon atoms which may be substituted at one or more positions with chloro or polyfluoroalkyl, chlorofluoroalkyl or polyfluorocycloalkyl groups containing up to six carbon atoms and the $R_F$ groups are interconnected to form a cyclic structure.

11 Claims, No Drawings

NOVEL MATERIALS CONTAINING NITROGEN

The present invention relates to compositions of matter which are nitrogen-containing free radicals and methods for their production.

According to the present invention there are provided compositions of matter including the structural unit

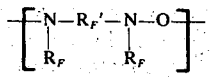

wherein $R'_F$ is a divalent polyfluoroalkylene group having a chain length of from 1 to 4 carbon atoms and where the polyfluoroalkylene group may be substituted at one or more positions with chloro- or polyfluoroalkyl, chlorofluoroalkyl or polyfluorocycloalkyl groups containing up to six carbon atoms and $R_F$ is a monovalent straight or branched chain, or cyclic, polyfluoroalkyl group containing up to ten carbon atoms or a chlorofluoroalkyl group containing up to ten carbon atoms and the $R_F$ groups are the same or different or is a divalent polyfluoroalkylene group having a chain length of from 1 to 4 carbon atoms and where the polyfluoroalkylene group may be substituted at one or more positions with chloro- or polyfluoroalkyl, chlorofluoroalkyl or polyfluorocycloalkyl groups containing up to six carbon atoms, and the $R_F$ groups are interconnected to form a cyclic structure.

The term polyfluoro as used herein includes, and is preferably perfluoro.

The term chlorofluoroalkyl as used herein refers to substituted alkyl groups in which only carbon, fluorine and chlorine atoms are present. Advantageously not more than one atom of chlorine is present in any chlorofluoroalkyl group.

In accordance with one aspect of the present invention there are provided compositions of matter including the structural unit

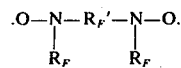

wherein $n$ is an integer, and $R_F$ and $R'_F$ are as hereinbefore defined. Compositions of matter according to this aspect of the invention include bisnitroxide compounds and polymeric compositions which may have one or more free radical end groups.

Bisnitroxide compounds of the present invention have the general formula

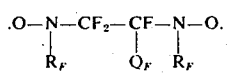

and preferably bisnitroxide compounds have the general formula

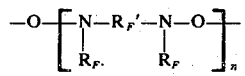

wherein $Q_F$ is chlorine or fluorine or a straight or branched chain, or cyclic, polyfluoroalkyl group containing up to six carbon atoms or a chlorofluoroalkyl group containing up to six carbon atoms.

Preferred bisnitroxide compounds according to this aspect of the invention have the general formula

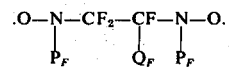

wherein $P_F$ is a monovalent straight or branched chain, or cyclic, polyfluoroalkyl group containing up to ten carbon atoms or a chlorofluoroalkyl group containing up to ten carbon atoms and the $P_F$ groups are the same or different, and $Q_F$ is as hereinbefore defined.

One embodiment of a preferred bisnitroxide diradical of the present invention is perfluoro-(2,5-diazahexane-2,5-dioxyl) which has the formula

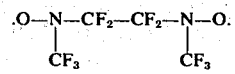

which is a purple gas condensing to a purple liquid and then to a yellow brown solid at −196°C.

A further embodiment of a bisnitroxide diradical is

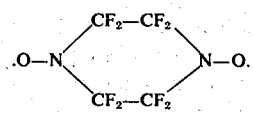

which may be produced during thermolysis of a polymeric composition of the present invention including the repeating unit

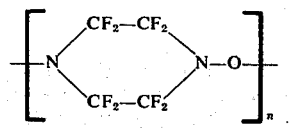

where $n$ is an integer.

In accordance with an aspect of the present invention a process for the production of a bisnitroxide diradical of the formula

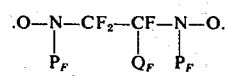

and wherein $P_F$ and $Q_F$ are as hereinbefore defined, includes the steps of reacting together equivalent proportions of a polyfluoroethylene of formula $CF_2{=}CF.Q_F$ and phosphorus trichloride with two equivalent proportions of a polyfluoronitrosoalkane of formula $P_FNO$ or with equivalent proportions of two different polyfluoronitrosoalkanes each having a formula $P_FNO$ to form an adduct, then hydrolysing the adduct to form a hydroxylamine of formula

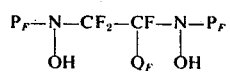

together with phosphoric and hydrochloric acids, and subsequent oxidation of the hydroxylamine to produce the aforesaid bisnitroxide diradical.

Suitable oxidizing agents for use in processes in accordance with this aspect of the present invention are those oxidizing agents which are normally used for the oxidation of hydroxylamines, and include acidified permanganate solutions and argentic oxide. It is not necessary for the hydroxylamine $$P_F-N(OH)-CF_2-CF(Q_F)-N(OH)-P_F$$

to be separated from other products of the hydrolysis of the adduct, when so formed, prior to oxidation to the bisnitroxide. Furthermore, it is not essential that the hydrolysate should be prepared and isolated from the adduct prior to oxidation, as it is possible for the hydrolysis stage to be carried out in situ by oxidizing the adduct in the presence of water, for example.

A preferred bisnitroxide, perfluoro-(2,5-diazahexane-2,5-dioxyl)

$$.O-N(CF_3)-CF_2-CF_2-N(CF_3)-O.$$

is prepared by the reaction of 1 equivalent of trifluoronitrosomethane with 2 equivalents of tetrafluoroethylene in the presence of 1 equivalent of phosphorus trichloride, whereby an adduct is formed to which the structure of the type

[Ring structures with CF$_3$—N, CF$_2$—CF$_2$, O, PCl$_3$ or zwitterionic form with PCl$_3^-$]

may be attributed by reference to the work of:
A. Ya Yakubovich, P. O. Gitel', Z. N. Lagutina, and F. N. Chelobov, *Zhur.obshchei Khim.*, 1966, 36, 163 and of
V. A. Ginsburg, L. L. Martynova, M. F. Lebedeva, S. S. Dubov,
A. N. Medvedev and B. I. Tetel'baum, *Zhur.obshchei Khim.*, 1967, 37, 1073.

The adduct is then hydrolysed, preferably by controlled addition of water at 0°C, to form the hydroxylamine $$HO-N(CF_3)-CF_2-CF_2-N(CF_3)-OH$$

and then oxidized, preferably with acid permanganate, to give the bisnitroxide diradical.

In accordance with an alternative aspect of the present invention there is provided a composition of matter having the general formula

[Four-membered ring: $P_F-N$, $R'_F$, $N-P_F$, O]

and particularly the composition of matter having the general formula

[Five-membered ring with $CF_2CF(Q_F)$, $P_F-N$, $N-P_F$, O]

wherein $P_F$, $Q_F$, and $R'_F$ are as hereinbefore defined.

One embodiment of a composition of matter in accordance with this aspect of the invention is the compound perfluoro-(2,5-dimethyl-1-oxa-2,5-diazacyclopentane) which has the formula

[Five-membered ring: $CF_3-N$, $CF_2-CF_2$, $N-CF_3$, O]

In accordance with an aspect of the present invention a process for the production of a composition of matter having the general formula

[Four-membered ring: $P_F-N$, $R_F'$, $N-P_F$, O]

includes the step of treating a bisnitroxide diradical having the formula $$.O-N(P_F)-R_F'-N(P_F)-O.$$

with a polyfluoronitroso-alkane $P_F$NO wherein $P_F$ and $R'_F$ are as hereinbefore defined.

In a preferred process in accordance with this aspect of the invention a bisnitroxide diradical having the general formula $$.O-N(P_F)-CF_2-CF(Q_F)-N(P_F)-O.$$

is treated with a polyfluoronitrosoalkane $P_F$NO whereby a composition of matter having the formula

[Five-membered ring: $P_F-N$, $CF_2-CF(Q_F)$, $N-P_F$, O]

is formed.

A preferred compound, perfluoro-(2,5-dimethyl-1-oxa-2,5-diazacyclopentane), having the formula

[Five-membered ring: $CF_3-N$, $CF_2-CF_2$, $N-CF_3$, O]

is preferably produced by the reaction between trifluoronitrosomethane $CF_3NO$ and perfluoro-(2,5-diazahexane-2,5-dioxyl)

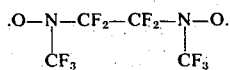

It is believed that thermolysis of compositions of matter having the general formula

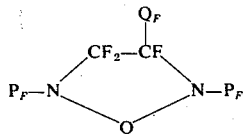

leads to the formation of a diradical in accordance with one aspect of the present invention having the formula

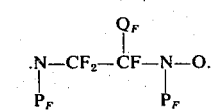

The thermolysis of the composition of matter having the formula

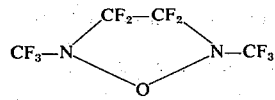

eventually leads to the formation of a polynitrone believed to have the formula

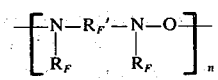

and which is a purplish gum.

In accordance with a further alternative aspect of the present invention a composition of matter is a polymeric composition including the structural unit

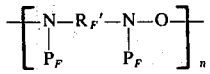

where $n$ is an integer of 1 or more and $R_F$ and $R'_F$ are as hereinbefore defined.

One preferred polymeric composition of this aspect of the invention includes the structural unit

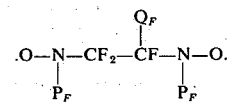

wherein $n$ is an integer of 1 or more and $P_F$ and $Q_F$ are as hereinbefore defined.

In accordance with an aspect of the present invention a process for the production of a polymeric composition including the structural unit

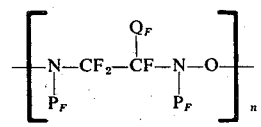

includes the step of treating a bisnitroxide diradical having the formula

.O—N—R'—N—O.
  |       |
  $P_F$   $P_F$ with a polyfluoronitrosoalkane $P_FNO$ wherein $P_F$ and $R'_F$ are as hereinbefore defined.

Preferably a bisnitroxide diradical having the formula

.O—N—$CF_2$—$CF$—N—O.
  |         |        |
  $P_F$    $Q_F$    $P_F$ is treated with a polyfluoronitrosolakane $P_FNO$ whereby a polymeric composition including the polyfluoronitrosoalkane unit

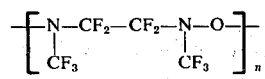

is produced.

In a preferred process in accordance with this aspect of the present invention perfluoro-(2,5-diazahexane-2,5-dioxyl is treated with trifluoronitrosomethane $CF_3NO$ whereby a polymeric composition including the structural unit

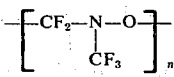

and also the unit

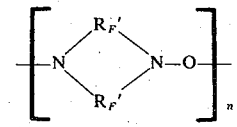

is produced.

In accordance with a further alternative aspect of the present invention a composition of matter is a polymeric composition including the structural unit

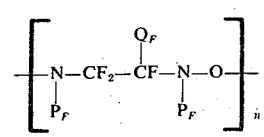

wherein $R'_F$ is as hereinbefore defined and $n$ is an integer of 1 or more.

Preferred compositions of matter in accordance with this aspect of the invention include a structural unit having the general formula

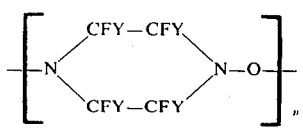

wherein Y is a fluorine or chlorine atom or a polyfluoroalkyl chlorofluoroalkyl or polyfluorocycloalkyl group containing up to six carbon atoms and may be the same or different.

Another preferred polymeric composition of this further alternative aspect of the invention includes the repeating unit

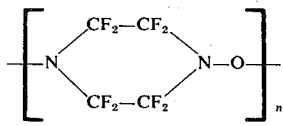

and is a white wax.

Polymeric compositions in accordance with this aspect of the present invention are precursors of nitrogen containing diradicals in accordance with the invention including

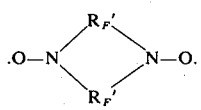

and

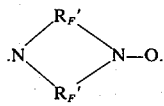

and also, possibly, the diradical

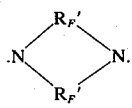

and these diradicals are formed on heating the polymer. As some of these diradicals may have a short half-life they are normally formed in situ during reactions in which polymeric compositions of this alternative aspect of the invention are used.

In accordance with a further alternative aspect of the invention, a process for the production of a material which is a polymeric composition having the general formula

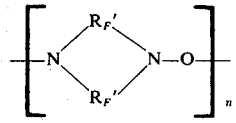

where $R'_F$ is as previously defined, comprises fluorinating the unfluorinated, or partially fluorinated compound having the general formula

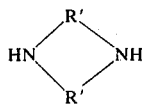

wherein R' groups are the unfluorinated or partially fluorinated equivalents of $R'_F$ followed by photolysing the fluorinated product in the presence of oxygen and/or silica.

Fluorination is preferably carried out by an electrochemical fluorination technique. For example, the preferred polymeric composition

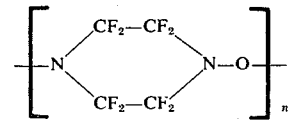

is prepared by electrochemical fluorination of piperazine,

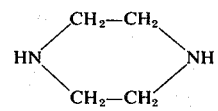

where the novel perfluoro-N,N'-difluoropiperazine,

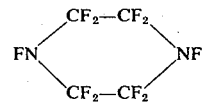

is formed, and photolysis of this piperazine with oxygen and/or silica whereupon a waxy solid having the formula

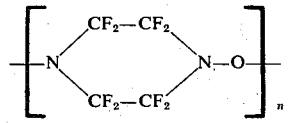

is formed.

The novel compositions of matter of the present invention, that is the diradicals, compounds and polymeric compositions hereinbefore disclosed are particularly useful for cross-linking polyfluoropolymers containing pendant perfluorovinyl groups, including nitroso-rubbers, as disclosed in our co-pending patent application 4383/72.

Nitroso-rubbers are polymers formed by the reaction of a perfluoronitrosoalkane with a perfluoro-olefin, and contain the —N-O-C-C unit in the main chain of the polymer. A typical nitroso-rubber is that formed by the reaction of trifluoronitrosomethane with tetrafluoroethylene to give the polymer

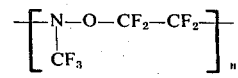

and the ratio of nitroso-compound to olefin in the polymer is always 1:1. Terpolymers containing unsaturation can be prepared, for example, by the incorporation of a diene such as perfluorobutadiene; the terpolymer then contains both

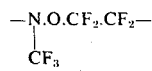

and

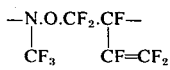

plus

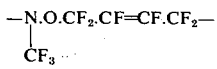

units, and the ratio of the nitroso-compound to the olefin + diene in the terpolymer is still 1:1. Preferably such polymers are perfluorinated.

No completely satisfactory method has hitherto been known for the cross-linking of such polymers or terpolymers without the loss of some of the outstanding chemical resistance and useful low-temperature properties that the nitroso-polymers possess; thermal stability is also often diminished by use of cross linking agents such as diamines (eg hexamethylenediamine) or diols, or conventional free radical sources such as benzoyl peroxide. In general trifluoronitrosomethane-tetrafluoroethylene elastomers have not been capable of continuous use much above 150°C.

Some processes for the production of compositions of matter of the present invention will now be described by way of example only.

EXAMPLE 1

A solution of piperazine in anhydrous hydrogen fluoride was prepared by adding piperazine very carefully to anhydrous hydrogen fluoride precooled to −78°C. The solution was transferred to a 4 liter nickel cell fitted with nickel anodes and subjected to electrolysis at 25 amp. A dense colourless liquid commenced to collect after about two days in a refrigerated (−78°C) steel trap. Hydrofluoric acid and piperazine were replenished at about weekly intervals during the electrolysis. The products were washed with an excess of 2N-sodium hydroxide, dried with magnesium sulphate, and then separated by preparative gas-liquid chromatography. The perfluoro-N,N'-difluoropiperazine fraction was a dense colourless volatile liquid, b.p. 44°C, with a musty smell. An equimolar mixture of perfluoro-N,N'-difluoropiperazine and oxygen was irradiated with ultraviolet light in a photochemical reactor containing a silica insert for one week, whereupon a white waxy solid was deposited on the silica insert. The waxy solid melted at 223°C with decomposition, and was highly insoluble in all common solvents and fluorinated solvents.

Analytical results were C, 18.8; N, 10.8; F, 58.9% [$(C_4F_8N_2O_2)_n$ requires C, 18.5; N, 10.8; F, 58.5%; and $(C_4F_8N_2O)_n$ requires C, 19.7; N, 11.5; F, 62.3%]. However, mass spectrometry indicated molecular fragmentation by loss of $C_4F_8N_2O$ fragments, as the peaks were at regular intervals of 244, mass numbers suggesting the formula

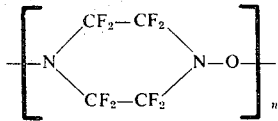

EXAMPLE 2

Trifluoronitrosomethane (13.16 g, 132.9 mmoles), tetrafluoroethylene (6.65 g, 66.45 mmoles) and phosphorus trichloride (9.13 g, 66.45 mmoles) were sealed in vacuo in a 250 ml Pyrex tube and maintained at −35°C for 5 days. Although the blue colour of trifluoronitrosomethane remained, a considerable quantity of clear liquid has formed in the tube. Fractionation of the volatiles by trap-to-trap condensation in vacuo yielded the adduct $2CF_3NO.C_2F_4.PCl_3$, the yield being 39%. Direct addition of water to the $2CF_3NO.C_2F_4.PCl_3$ adduct gave a vigorous exothermic reaction, so controlled hydrolysis was carried out by the gradual addition of water (ca. 5 ml) to the adduct (0.920 g, 2.11 mmoles) contained in a hydrolysis bulb immersed in an ice-bath. The reaction mixture obtained from the hydrolysis of the $2CF_3NO.C_2F_4.PCl_3$ was found to contain 1,4-bistrifluoromethyl-1,4-dihydroxy-1,4 -diazabutan-2,3-dione a white crystalline solid, m.p. 162°, and hydrogen chloride. The reaction mixture was added dropwise over a 1 hour period to a solution of potassium permanganate (1 g) in dilute sulphuric acid (10 ml containing 10% (V/V) of concentrated acid) stirred magnetically at 90°C in a 50 ml three-necked flask fitted with a dropping funnel, air bleed, and cold water condenser. The airstream containing volatile products was continuously passed at ca. 20 cm.Hg pressure through the condenser into traps maintained at −196°C. After 5 hours, during which time the permanganate was replenished, when the ereaction mixture became colourless, by reaction addition of a saturated aqueous solution (15 ml), the products were fractionated by trap-to-trap condensation in vacuo. Perfluoro-(2,5-diazahexane-2-5-dioxyl) (0.519g, 1.74 mmoles), a purple gas condensing to a purple liquid and then to a yellow-brown solid at −196°C was formed, the yield being 83%.

EXAMPLE 3

The adduct $2CF_3NO.C_2F_4.PCl_3$ was prepared and hydrolysed as in Example 2.

A solution of potassium permanganate in glacial acetic acid was added to the hydrolysis mixture at room tempreature. The temperature was increased to 60°–70°C and volatiles were continuously removed at ca 20 cm.Hg pressure over 3 hours. The yield of perfluoro-(2,5-diazahexane-2-5-dioxyl was found to be 1%. When the oxidation was carried out with potassium permanganate in dilute sulphuric acid as in Example 2, but the temperature was maintained at room temperature, the yield was 18%. When the solution of potassium permanganate in dilute sulphuric acid was added to the hydrolysis product at 70°–90°C and the volatiles were continuously removed at ca. 20 cm.Hg pressure over 3 hours, the yield was found to be 27%.

EXAMPLE 4

The adduct $2CF_3NO.C_2F_4.PCl_3$ was prepared as in Example 2. The adduct (0.350g, 0.803 mmole) was sealed with a large excess of argentic oxide AgO (5 g) and a minimal amount of water (ca0.5 ml) in a 50 ml Pyrex tube, and kept at room temperature for 2 days.

The yield of perfluoro-(2,5-diazahexane-2-5-dioxyl) was found to be 5.5%. Subsequently heating the tube contents to about 200°C increased the yield to 15%.

EXAMPLE 5

Perfluoro(2,5-dioxyl-2,5-diazahexane) (3.81g, 12.8 mmol) and trifluoronitrosomethane (2.52g, 25.6 mmol) were condensed in vacuo in a 300 cm³ Pyrex tube which was then sealed and shaken mechanically for 3 days at room temperature in darkness. The products were a viscous liquid which formed ca. 45% by weight of the products, $CF_3NO_2$, $CF_3-N=CF_2$. and unreacted $CF_3NO$. The liquid was freed from volatile materials by evacuation at room temperature under a pressure of less than 0.1 mm Hg, and could be used directly as a crosslinking agent for polyfluoropolymers containing pendant perfluorovinyl groups. The low volatility liquid is believed to have the structure

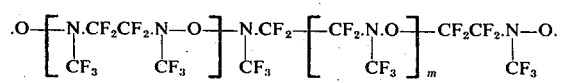

and the effective cross-linking agents may be diradicals formed by the thermal decomposition of the polymer molecules.

EXAMPLE 6

Trifluoronitrosomethane (4.65 g, 47.0 mmol) and perfluoro-(2-5-diazahexane-2-5-dioxyl) (3.19 g, 10.7 mmol) were condensed separately into a cold (−196°C), evacuated, Pyrex tube (300 ml capacity). The tube was sealed, in vacuo, and allowed to warm to 0°C, then stored in the dark at this temperature for 10 days (calculated initial pressure = ca. 4 atm). Fractionation of the volatile product gave perfluoro2-azapropene, trifluoronitromethane, trifluoronitrosomethane, and perfluoro-(2,5-dimethyl-1-oxa-2,5-diazacyclopentane) (1.39 g) (Found: C, 17.0; F, 67.1; N, 10.0%. $C_4F_{10}N_2O$ requires C, 17.0; F, 67.4; N, 9.9%), extrapolated b.p. 60°C (isoteniscope), the structure of which was determined by spectroscopic methods (i.r., ¹⁹F n.m.r., and mass). An involatile purplish gum (0.51 g), shown by mass spectrometric analysis to contain the structural unit

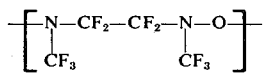

and possibly

remained in the reaction vessel.

Storage of perfluoro-(2,5-dimethyl-1-oxa-2,5-diazacyclopentane) at room temperature in a Pyrex tube for 5 weeks caused it to undergo <95% decomposition into perfluoro-2-azapropene and a purplish gum, shown by mass spectrometry to be essentially the polynitrone

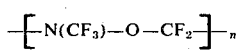

(Found: C, 16.1; N, 9.5%. $C_2F_5NO$ requires C, 16.1; N, 9.4%).

Processes for cross-linking unsaturated nitroso-rubber with compositions of matter of the invention will now be described by way of example only.

EXAMPLE 7

A 1 liter stainless steel autoclave containing an aqueous solution of lithium bromide and magnesium carbonate was charged with trifluoronitrosomethane, tetrafluoroethylene and hexafluorobutadiene in the molar ratio of 1.0:.7:0.3 respectively. The contents were stirred at 1500 rpm for 20 hours at a temperture of −20°C and then allowed to warm to room temperature over a period of 16 hours. Volatiles were pumped away and dilute hydrochloric acid was added to destroy the magnesium carbonate and cause the polymer to coalesce. The terpolymer was purified by acid washing a solution of the polymer in 1,1,2-trichlorotrifluoroethane ($CF_2Cl.CFCl_2$). The terpolymer was found to have an intrinsic viscosity of 0.21 in perfluorotributylamine at 25°C.

A 1 g sample of the terpolymer was mixed to a paste with 0.1 g of the polymeric composition prepared as described in Example 1, and having the formula:

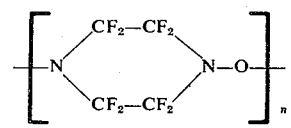

The paste was pressed between stainless steel plates in a polymer press. The pressure was maintained whilst the sample was heated gradually to 220°C for 15 minutes and held at this temperature for a further 5 minutes. The sample was cooled to room temperature before reducing the pressure. A tough brown polymer was formed which was highly elastomeric and insoluble in fluorinated solvents, benzene, ether, and n-hexane and only slightly swollen by acetone. Thermogravimetric analysis (nitrogen atmosphere; heating rate 15°C per min) showed the cured rubber (weight loss began at 180°C; 10% weight loss had occurred at 320°C and 20% at 370°C) to be more thermally stable than the raw terpolymer (10% weight loss had occurred at 290°C, and 20% at 305°C).

EXAMPLE 8

A 1 liter stainless steel autoclave containing an aqueous solution of lithium bromide and magnesium carbonate was charged with trifluoronitrosomethane, tetrafluoroethylene and hexafluorobutadiene in the molar ratio of 1:0.8:0.2 respectively. The contents were stirred at 1500 rpm for 20 hours at a temperature of −20°C and then allowed to warm to room temperature over a period of 16 hours. Volatiles were pumped away and dilute hydrochloric acid was added to destroy the magnesium carbonate and cause the polymer to coalesce. The terpolymer was purified by acid washing a solution of the polymer in 1,1,2-trichlorotrifluoroethane ($CF_2Cl.CFCl_2$).

A 10% solution of the terpolymer in 1,1,2-trichlorotrifluoroethane was mixed in proportion 10:1 by weight with perfluoro-(2,5-diazahexane-2-5-dioxyl), sealed in a Pyrex tube, and maintained at 75°C for 2 days. After removal of solvent, a tough resilient gel was formed which was insoluble in benzene, petroleum ether (30°–40°C range), or acetone at 40°C, but was swollen by hot 1,1,2-trichlorotrifluoroethane or by perfluorotributylamine.

EXAMPLE 9

A terpolymer containing trifluoronitrosomethane, tetrafluoroethylene and hexafluorobutadiene in the molar ratio ca. 1.0:0.75:0.25 was prepared by the method used in Examples 7 and 8, and was found to have an intrinsic viscosity of 0.21 dlg⁻¹ in perfluoro(tributylamine). 27.5 g of terpolymer was dissolved in 1,1,2-trichlorotrifluoroethane(CF$_2$Cl.CFCl$_2$) and separated by precipitation at 25°C using acetone as non-solvent. The high molecular weight fraction, a solid, was separated and used in cross-linking experiments with the polymeric product obtained in Example 5.

Mixtures for curing were prepared by dissolving weighed amounts of terpolymer and the polymeric product in 1,1,2-trichlorotrifluoroethane (CE$_2$Cl.CFCl$_2$) together with silica when added. After mixing the solvent was evaporated and the residue cured in a press, between PTFE sheets, for 3 hours at 155°C under 500–1000 psi.

The results obtained are tabulated below:

| Compounding | Vr | Gel Content % by weight | TGA onset 10% loss | |
|---|---|---|---|---|
| 100 parts terpolymer +10 parts polymeric composition | 0.45 | 94 | 125°C (Gel fraction) 205°C | 260°C 265°C |
| As above +15 parts silica | 0.48 | 92 | 125°C (Gel fraction) 200°C | 288°C 275°C |
| Raw | | | 205°C | 282°C |

The small sol fraction and initial weight loss at ca 125°C are probably due to residual vulcanising agent and/or its decomposition products. The raw terpolymer fraction gel all began & gel lose weight at about the same temperature ca 200°C. Thus this method of cross-linking yields products which are as stable thermally as the raw nitroso rubber.

We claim:

1. A composition of matter having the general formula

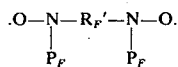

wherein R′$_F$ is a divalent polyfluoroalkylene group having a chain length of from 1 to 4 carbon atoms and which may have one or more substituents selected from a group consisting of chloropolyfluoroalkyl, chlorofluoroalkyl and polyfluorocycloalkyl groups containing up to six carbon atoms;

and P$_F$ is independently selected from a group consisting of polyfluoroalkyl, polyfluorocycloalkyl and chlorofluoroalkyl groups containing up to ten carbon atoms.

2. A composition of matter as claimed in claim 1 having the general formula

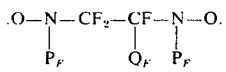

wherein P$_F$ is independently selected from a group consisting of polyfluoroalkyl, polyfluorocycloalkyl and chlorofluoroalkyl groups containing up to ten carbon atoms and Q$_F$ is selected from the group consisting of chloro-, fluoro- and polyfluoroalkyl, polyfluorocycloalkyl and chlorofluoroalkyl groups containing up to six carbon atoms.

3. Compositions of matter having repeating the structural unit

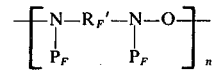

wherein n is an integer of 1 or more and P$_F$ and R′$_F$ are as defined in claim 1.

4. Compositions of matter having repeating the structural unit

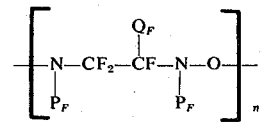

wherein n is an integer of 1 or more and P$_F$ and Q$_F$ are as defined in claim 2.

5. A compound having the formula

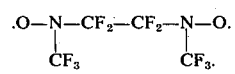

6. A polymeric composition having the repeating structural unit

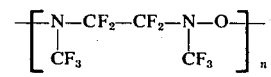

where n is an integer of 1 or more.

7. A polymer having the formula

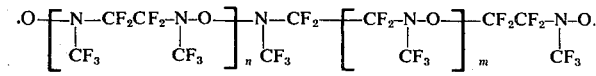

where n and m are integers of 1 or more.

8. A process for the production of a bisnitroxide diradical as claimed in claim 2 including the steps of reacting together substantially equivalent proportions of a polyfluoroethylene of formula CF$_2$ = CFQ$_F$ and phosphorous trichloride with two equivalent proportions of one or two polyfluoronitrosoalkanes of formula P$_F$.NO to form an adduct, and hydrolysing the adduct to form a hydroxylamine of formula

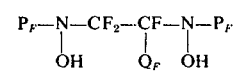

and subsequently oxidizing the hydroxylamine to produce a bisnitroxide diradical having the formula

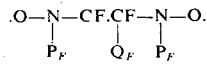

9. A process for the productin of perfluoro- (2,5 - dioxyl-2,5- diazahexane) as claimed in claim 5 including the steps of treating one equivalent of trifluoronitrosomethane with about two equivalents of tetrafluoroethylene in the presence of about 1 eqiivalent of phosphorous trichloride to form an adduct, hydrolysing the adduct to form the hydroxylamine

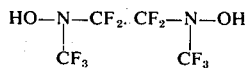

and oxidizing the hydroxylamine to give the bisnitroxide diradical

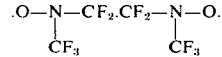

10. A process as claimed in claim 8 wherein the hydroxylamine is oxidized with an acidified permanganate solution or argentic oxide.

11. A process for the productin of a polymeric composition having the formula

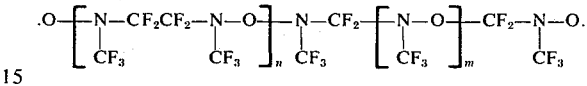

wherein m and n are integers of 1 or more which comprises reacting perfluoro-(2,5-diazahexane-2,5-dioxyl) with trifluoronitrosomethane.

* * * * *